May 19, 1936. E. H. REERINK ET AL 2,041,569
ELECTRODE SYSTEM HAVING UNSYMMETRICAL CONDUCTIVITY
Filed July 8, 1930
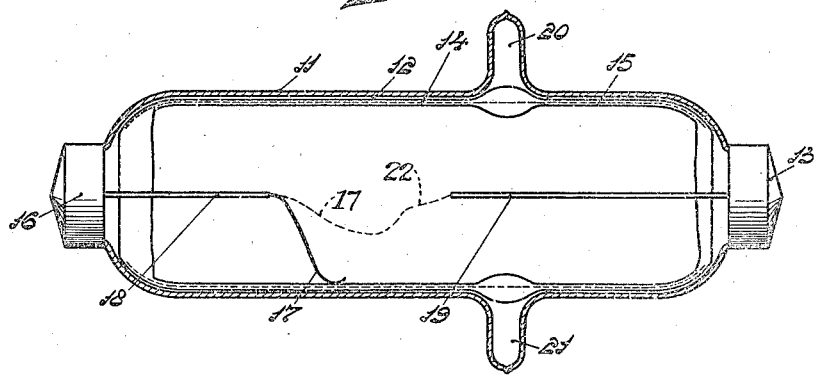
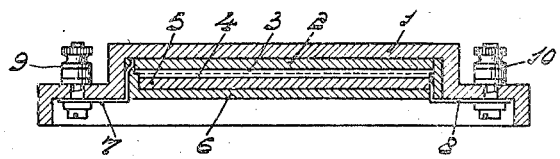
Inventors:
Engbert Harmen Reerink
Jan Hendrik De Boer Patented May 19, 1936

2,041,569

UNITED STATES PATENT OFFICE 2,041,569

ELECTRODE SYSTEM HAVING UNSYM-METRICAL CONDUCTIVITY

Engbert Harmen Reerink and Jan Hendrik de Boer, Eindhoven, Netherlands, assignors to N. V. Philips' Gloeilampenfabrieken Application July 3, 1930, Serial No. 466,532
In the Netherlands August 24, 1929

16 Claims. (Cl. 175—366)

Our invention relates to an electrode system having asymmetrical conductivity, which can be used among others as a detector for radio signals, but may also serve various other purposes, and to the methods of manufacturing same.

Our invention is based on the adsorption phenomenon exhibited between certain substances and on the asymmetrical conductivity obtained in an electrode system or element which comprises two substances which are adsorbed to each other.

By the term adsorption we refer to a surface contact effect between layers of two substances which are in intimate contact with each other and partly penetrate each other and which effect is distinguished from ordinary chemical combination at the contact surface of two substances. The adsorption effect is characterized by the fact that an adsorbed substance has a lower vapor pressure in its adsorbed state than in its free state.

Adsorption can be verified as a rule by the following test:

Superposed layers of the two substances to be examined, and referred to hereafter as A and B, are placed in a closed test tube. The tube is heated at the end at which are the substances to be examined. During the heating one of the two substances, for instance A, is driven off from B by evaporation and deposits on the cold end of the tube; this deposit contains the substance A, while the substance B remains in its original place. The heating of the container is now discontinued and the tube permitted to cool off.

If the vapor pressure of the substance A is higher in the free state of this substance than when it is in intimate contact with the substance B, the substance A will now tend to assume its state of lower vapor pressure and gradually redeposits on the substance B, whereby the substances A and B are adsorbed to each other. The deposition of the substance A on the substance B will continue until it forms a layer which is so thick that its free or outer surface is no longer influenced by the adsorption effect.

On the other hand, if under the above circumstances, the substance A does not redeposit on substance B it shows that the two substances do not adsorb with respect to each other.

Our electrode system or asymmetrical element contains two conductive electrodes between the surfaces of which is interposed a solid substance—hereafter referred to as the intermediate substance—the substance of the intermediate layer and of one of the electrode surfaces adsorbing to each other. The electrode which exhibits this adsorption effect will be hereafter referred to as adsorbed electrode. At the contact surface of the intermediate substance and the adsorbed electrode these substances form a very thin layer in which the two substances penetrate each other.

If an alternating voltage is supplied to the two electrodes of such an element a rectifier action is observed, the adsorbed electrode forming the negative electrode. This effect is especially pronounced if the intermediate substance constitutes a very thin film.

The asymmetrical conductivity of such elements is much more pronounced when the adsorbed electrode substance is no component ingredient of the compound forming the intermediate substance. For instance, when the intermediate substance is a metal compound and the adsorbed electrode a metal, the rectifying properties of such elements are much more pronounced if the electrode is not the metal of the compound.

The rectifying properties are also improved if the adsorbed electrode has a higher electron emissive power than the other electrode.

It is preferable to protect the elements from access of air to prevent deterioration due to chemical changes and other deleterious effects caused by air. For this purpose the element may be airtightly embedded in a casing of insulating material or it may be enclosed in a sealed container which is exhausted or filled with an inert gas.

To rectify higher voltages such elements may be arranged in series connection.

Our invention also comprises a method of making asymmetrical electrode systems or elements of the type described. According to such method either the substance of the negative electrode is caused to be adsorbed to the surface of a suitable intermediate substance or conversely, the intermediate substance is caused to be adsorbed to the surface of the negative electrode, such adsorption being effected for instance by volatilization or sublimation of the substance to be adsorbed.

In order that the invention may be clearly understood and readily carried into effect it will be described more fully with reference to the accompanying drawing in which some embodiments of our invention are illustrated.

Fig. 1 is a sectional side view of an asymmetrical element of our invention which is air-tightly embedded in an insulating casing.

Fig. 2 is a side view partly in section, of an asymmetrical element of our invention enclosed in a sealed vitreous container, also showing the method of making the element.

Referring to Fig. 1, the non-adsorbed or positive electrode 2 consists of a thin sheet of latten brass or a strip of tinfoil to which the film 3 of the intermediate substance is applied either by squirting or by applying the substance in the form of a solution from which the solvent easily and fully volatilizes.

The substance of the film 3 may be either a material classified as a good insulator or one classified as a poor conductor, and may be a salt, for instance, a halide salt as calcium fluoride, although various other substances as for instance, silicic acid, may be used.

The adsorbed or negative electrode 4 is of a substance which adsorbs to the intermediate substance, for instance, an alkali or alkaline earth metal and is preferably formed as a layer precipitated on the film 3. To secure the layer forming the adsorbed or negative electrode 4, the positive electrode 2—with the film 3 already formed thereon—may for example, be placed in a closed container, which is then exhausted. The substance from which the negative electrode 4 is to be formed is introduced into the container in its vapor state and is precipitated by condensation and solidification, or by sublimation to form a solid layer on the film 3. The dotted line indicates that the two substances are adsorbed to each other. It should be well understood that the thicknesses given in the drawing are greatly exaggerated, as for instance, the film 3 of the intermediate layer has only a thickness of a few thousandths of a millimeter.

In contact with the adsorbed electrode 4 there is provided a conductive sheet 5 which screens the electrodes. The asymmetrical element is disposed within a suitable casing 1 of insulating material, for instance, of an artificial resin product, on which are provided terminal screws 9 and 10 which are connected by means of conductors 7 and 8 to the electrode 2 and the sheet 5 respectively. To air-tightly enclose the asymmetrical element the casing is cast out with a suitable insulating material 6, which prevents access of air and also reduces the possibility of flash-over on the edges of the intermediate substance and thus protects the element from deterioration.

If alternating voltage is applied to the terminals 9—10 there will be only current flow in the direction for which the terminal 10 is negative. The system thus acts as a rectifier.

If desired to use such elements to rectify higher voltages, a number of such elements may be enclosed in a single housing in which the individual elements are connected in series, or the housing may contain a plurality of series connected element groups, the groups being in multiple.

Fig. 2 shows another embodiment of an asymmetrical element according to our invention which is provided in a sealed and evacuated or gas filled container and also illustrates the method of making same. A vitreous tubular envelope 11 is provided on its two ends with contact caps 13 and 16 and with extension tubes 20 and 21 to admit vapors and gas to the tube and to exhaust same. The tube is provided on its inner wall with a conductive layer, for instance, with a silver mirror 12, which has been deposited by the pulverization of a thin silver wire within the envelope, or in any other suitable way. The silver mirror constitutes the positive electrode of the element and extends to and electrically contacts with the terminal cap 13. Between the caps 13 and 16 is a conductor which is coated with a substance adapted to form the intermediate layer, which for instance, may be common salt. The conductor comprises a small spring 17 which is connected to the cap 16 by the portion 18 of the conductor. On the other end the spring 17 is connected through a thin and readily fusible wire 22 to the portion 19 of the conductor leading to cap 13. When a suitable voltage is applied between the terminal caps 13 and 16 the current flowing through the conductor volatilizes the salt and causes it to deposit in the form of a film 14 upon the silver layer 12.

The tube is exhausted and the substance of the negative electrode is caused to deposit on the layer 14 for instance by admitting to the tube a suitable vapor through extensions 20 or 21, which deposits then on the intermediate layer 14 in the form of a layer 15, whereby the layer 15 is adsorbed by the layer 14. A current of greater intensity is then passed through the conductor between the caps 13 and 16, which causes the wire 22 to fuse thereby releasing spring 17 which now contacts with the adsorbed electrode 15 and connects same with terminal cap 16. The tube is now exhausted or if desired filled with an inert gas, then sealed at 20 and 21 whereupon the element is ready for use.

Again the exhausting or filling with an inert gas of the envelope greatly improves the characteristics of the elements. The removal of air among other things prevents the trapping of air in the pores of the intermediate layer which may otherwise cause the breakdown of the element.

While the method now described is particularly suitable for providing asymmetrical elements of our invention in evacuated or gas filled containers, other methods may be used. For instance, instead of using a glass envelope provided with a conductive layer to form the positive electrode, the envelope itself may be of conductive material, for instance, it may be a ferro-chrome container forming the positive electrode. On the ferro-chrome cylinder is then deposited the intermediate layer and thereupon the negative electrode. In the case of ferro-chrome for the positive electrode aluminum is a very suitable negative electrode.

As is known, there are a great many combinations of substances which can be mutually adsorbed. In such combinations one substance is usually a metal or an element having more or less metallic properties, the other substance having the properties of a dielectric.

As the metal or element having more or less metallic properties may be mentioned the alkali metals, for example potassium, sodium, lithium, rubidium, cæsium; the alkaline earth metals, for example magnesium, barium, strontium and calcium; further a great many other substances such as aluminum, iodine, bromium, sulfur and selenium.

The substances forming the dielectric in such combinations are:

Halides, such as alkaline earth halides, for example calcium fluoride, magnesium fluoride, barium chloride, etc.; alkali halides, for example sodium chloride, potassium chloride, sodium fluoride, rubidium bromide, etc.; halides of metals of the sub-groups of the periodic system, for example lead chloride, lead fluoride, cadmium iodide, silver iodide, etc.

Alkali oxides, for example lithium oxide, sodium oxide, cæsium oxide, etc.

Earth alkaline oxides, for example magnesium oxide, calcium oxide, barium oxide, etc.

Oxides of the metals of the third group of the periodic system, for example aluminum oxide, lanthanium oxide, etc.

Oxides of the metals of the fourth group of the periodic system, for example silicium oxide (silicic acid), titanium oxide, zirconium oxide, etc.

A number of sulfides, for example calcium sulfide, lead sulfide.

Several complex chemical compounds such as sodium-silicofluoride, potassium zirconium-fluoride, potassium magnesium-chloride, and other complex halides and oxides, as for instance different glasses.

All combinations of the above adsorptive substances show the rectifying action to a lesser or greater degree; the specific combinations given as examples giving in general the best results.

What we claim is:

1. An electrode system comprising a conductive electrode surface of an earth metal, another conductive electrode surface of silver, and a solid intermediate layer of common salt between said electrode surfaces, the first electrode surface and the layer of common salt being mutually adsorbed.

2. An asymmetrical element comprising two conductive electrode surfaces, a solid intermediate substance sandwiched between said electrode surfaces, the substance of one of said surfaces and the intermediate substance being substances which are mutually adsorbed, an evacuated envelope enclosing said electrodes and intermediate substance, and hermetically sealed leads extending through the envelope for said electrodes.

3. An asymmetrical element comprising a conductive electrode surface of earth metal and another conductive electrode surface of silver, a solid intermediate layer of common salt between said electrodes, the earth metal surface and the layer of common salt being mutually adsorbed, an evacuated envelope enclosing said electrodes and intermediate substance, and hermetically sealed leads extending through the envelope for said electrodes.

4. A method for manufacturing an electrode system containing a solid intermediate substance sandwiched between two conductive electrode surfaces comprising the steps of introducing in an envelope consisting in part of a metal, the vapor of an insulating substance, and subjecting the vapor in the envelope to such a temperature that a layer of the insulating substance is deposited on the metal portion of the envelope, thereafter introducing the vapor of a conducting substance which will adsorb to the insulating substance, and depositing it on the insulating layer.

5. A method for manufacturing an electrode system containing a solid intermediate substance sandwiched between two conductive electrode surfaces, comprising the steps of introducing in an envelope consisting in part of metal, the vapor of common salt, and subjecting the vapor in the envelope to such a temperature that a layer of the common salt is deposited on the metal portion of the envelope, thereafter introducing the vapor of aluminum, which will adsorb to the layer of common salt, and depositing the aluminum on the said layer of salt.

6. A method of manufacturing an electrode system containing a solid intermediate substance sandwiched between two conductive electrode surfaces, comprising the steps of introducing in a tube consisting partly of a metal and partly of glass, the vapor of an insulating substance, heating the tube to such a temperature that a layer of the insulating substance is deposited on the wall of the tube, thereafter introducing the vapor of a conductive substance adsorbing to the insulating substance, depositing it on the insulating layer, and providing a lead-in wire sealed through the glass part of the tube, for said conductive layer.

7. A method of manufacturing an electrode system containing a solid intermediate substance sandwiched between two conductive electrode surfaces, comprising the steps of successively depositing insulating and conductive layers on the interior wall of an envelope, providing a heating wire including a spring in the said envelope, vaporizing from said heating wire a conductive substance, and causing said substance to deposit on the wall of the envelope, and thereafter increasing the heating current to fuse the wire and release the spring, thereby causing the spring to contact with the conductive layer of the substance deposited on the wall of the envelope.

8. A method of manufacturing an electrode system containing a solid intermediate substance sandwiched between two conductive electrode surfaces, comprising the steps of pulverizing a silver wire within an envelope to produce a silvered mirror on the inner wall of the envelope contacting with a conductor sealed through part of the envelope, volatilizing common salt from a heating wire which partly consists of a spring connected at each end to a rod sealed through the wall of the tube, inserting through a side tube joined to the envelope the vapor of an alkaline earth metal which is deposited as an adsorbed layer on the layer of common salt, and passing a current of sufficient intensity through the heating wire so that at one end the connection of the spring to the rod melts and the spring is allowed to bend towards the wall of the tube and contact with the layer of alkaline earth metal.

9. An electrode system having asymmetrical conductivity, comprising two conductive electrode surfaces one of which has a high electrical conductivity, a solid insulating substance interposed between said electrode surfaces and forming a thin film, the substance of the second electrode surface and the intermediate substance being substances which are mutually adsorbed.

10. An electrode system having asymmetrical conductivity, comprising two conductive electrode surfaces one of which has a high electrical conductivity, a relatively poor conducting solid substance interposed between said electrode surfaces and forming a thin film, the substance of the second electrode surface and the intermediate substance being substances which are mutually adsorbed, the adsorbed electrode surface and the intermediate substance having no common component ingredient.

11. An electrode system having asymmetrical conductivity, comprising two conductive electrode surfaces one of which has a high electrical conductivity, a solid insulating substance interposed between said electrode surfaces and forming a thin film, the substance of the second electrode surface and the intermediate substance being substances which are mutually adsorbed, said second electrode surface having higher electron-emissive power than the surface of the highly conductive electrode.

12. An asymmetrical element comprising two conductive electrode surfaces one of which has a high electrical conductivity, a solid insulating substance interposed between said electrode surfaces and forming a thin film, the substance of the second electrode surface and the intermediate substance being substances which are mutually adsorbed, an evacuated envelope enclosing said electrodes and said intermediate substance, and hermetically-sealed leads extending through the envelope and connected to said electrodes.

13. An electrode system comprising an alkaline earth metal electrode, a metal foil, and a solid intermediate layer of a halide between said electrodes, the surface of the first electrode and the intermediate layer being mutually adsorbed.

14. An electrode system having asymmetrical conductivity comprising two conductive electrode surfaces, one of which has a high electrical conductivity, a solid insulating substance interposed between said electrode surfaces and forming a thin film, the substance of the second electrode surface and the intermediate substance being substances which are mutually adsorbed, said second electrode surface consisting of a metallic element and having a higher electron-emissive power than the surface of the highly conductive electrode.

15. An electrode system having asymmetrical conductivity, comprising two conductive electrode surfaces, one of which has a high electrical conductivity, a solid insulating substance interposed between said electrode surfaces and forming a thin film, the substance of the second electrode surface and the intermediate substance being substances which are mutually adsorbed, said adsorbed electrode surface consisting of a metallic element, said metallic element forming no component ingredient of the intermediate substance.

16. An electrode system having asymmetrical conductivity, comprising two conductive electrode surfaces, one of which has a high electrical conductivity, a solid insulating substance interposed between said electrode surfaces and forming a film having a thickness of the order of a few thousandths of a millimeter, the substance of the second electrode surface and the intermediate substance being substances which are mutually adsorbed.

ENGBERT HARMEN REERINK.
JAN HENDRIK DE BOER.